(12) United States Patent
Holtmanns et al.

(10) Patent No.: US 8,347,090 B2
(45) Date of Patent: Jan. 1, 2013

(54) ENCRYPTION OF IDENTIFIERS IN A COMMUNICATION SYSTEM

(75) Inventors: Silke Holtmanns, Klaukkala (FI); Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1213 days.

(21) Appl. No.: 11/902,506

(22) Filed: Sep. 21, 2007

(65) Prior Publication Data

US 2008/0130898 A1   Jun. 5, 2008

Related U.S. Application Data

(60) Provisional application No. 60/851,750, filed on Oct. 16, 2006.

(51) Int. Cl.
*H04L 9/32* (2006.01)

(52) U.S. Cl. .......... 713/168; 380/27; 380/247; 380/277; 380/278; 380/282; 380/285; 380/30; 726/2; 726/29; 713/155; 713/156; 713/160; 713/171; 713/175; 713/164; 455/411

(58) Field of Classification Search .......... 726/5
See application file for complete search history.

(56) References Cited

U.S. PATENT DOCUMENTS

| 5,557,654 | A | * | 9/1996 | Maenpaa | 455/411 |
|---|---|---|---|---|---|
| 5,940,512 | A | | 8/1999 | Tomoike | |
| 6,373,949 | B1 | | 4/2002 | Aura | |
| 7,107,248 | B1 | * | 9/2006 | Asokan et al. | 705/67 |
| 2002/0012433 | A1 | * | 1/2002 | Haverinen et al. | 380/247 |
| 2003/0072450 | A1 | | 4/2003 | Maggenti | |
| 2005/0135610 | A1 | * | 6/2005 | Chen et al. | 380/30 |
| 2005/0287990 | A1 | * | 12/2005 | Mononen et al. | 455/411 |
| 2006/0141987 | A1 | | 6/2006 | De Groot | |
| 2007/0242830 | A1 | * | 10/2007 | Conrado et al. | 380/285 |
| 2008/0002829 | A1 | * | 1/2008 | Forsberg et al. | 380/247 |

FOREIGN PATENT DOCUMENTS

EP   0 982 958 A2   3/2000

OTHER PUBLICATIONS

International Search Report, PCT/IB2007/002947 filed Jan. 10, 2007.

* cited by examiner

*Primary Examiner* — Nathan Flynn
*Assistant Examiner* — Bryan Wright
(74) *Attorney, Agent, or Firm* — Mintz, Levin, Cohn, Ferris, Glovsky & Popeo P.C.

(57) ABSTRACT

A method and apparatus including units configured to send a request from a first network entity to a user equipment for an identifier and receive a message indicating that a public key is required from the user equipment by the first network entity. The method and apparatus also includes units configured to send, by the first network entity, the public key to the user equipment and receive an encrypted identifier by the first network entity, wherein upon authenticating the public key, the user equipment encrypts at least part of the identifier using the public key, thereby enabling further processing between the network entity and the user equipment.

34 Claims, 5 Drawing Sheets

Once authenticated, the user equipment encrypts at least a part of the identifier using the public key and sends the encrypted identifier to the first network entity. — 112

If the first network entity is capable of decrypting the identifier, it is then decrypted. However, if decryption is not possible at the first network entity, the second network entity is asked for assistance in decrypting the encrypted identifier as set out below. — 114

The first network entity can either send the encrypted identifier to the second network entity to decrypt the identifier on its behalf. Alternatively, it can request the necessary secret key from the second network entity for decrypting the encrypted identifier itself. — 116

Fig. 2 (continued)

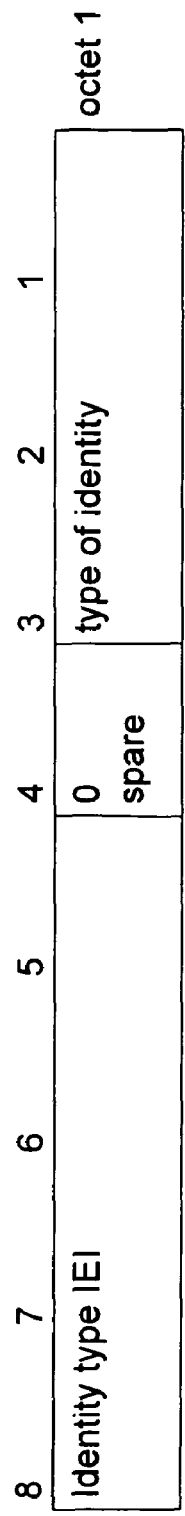

ENCRYPTION OF IDENTIFIERS IN A COMMUNICATION SYSTEM

FIELD OF THE INVENTION

The invention relates to identifiers that are used in a communication system, and more particularly to identifiers that are at least partially encrypted.

BACKGROUND

An identifier may be associated with a communication device to identify either the device, the user thereof (the "subscriber") or both. A communication device is a device that is typically used for communication via a communication system. The communication device enables the users of the device to receive and transmit communication such as speech and data. A communication system can be seen as a facility that enables communication sessions between two or more entities such as the communication devices and/or other nodes associated with the communication system. Subscribers to a communication system may be offered and provided numerous services via their communication devices. Non-limiting examples of these services include two-way or multi-way calls, data communication or multimedia services or simply an access to a data communications network system, such as the Internet. The services may be offered by an operator of a network of the communication system or by an external service provider.

Examples of communication systems include fixed line communication systems, such as a public switched telephone network (PSTN), wireless or mobile communication systems, such as a public land mobile network (PLMN), and local area networks, fixed or wireless (e.g. LAN, WLAN and WiFi). In the mobile system, the users are allowed access to the communication system via a radio access network. For example, in cellular and wireless local systems, a base station (BS) or similar access entity services a communication device via a wireless or air interface. Communication on the wireless interface between the communication device and elements of the access system is based on an appropriate communication protocol. Operation of the base station apparatus and other apparatus required for the communication can be controlled by one or several control entities. The various control entities may be interconnected.

A feature of wireless communication systems is that they provide mobility for the users thereof. That is, the user may roam within the service area of his/her home network from one access network to another. The users are also typically allowed to roam into other networks, thus enabling use of the communication device even when the user is not located within the service area of his/her home network but is visiting another network that can be of the same or of a different nature.

Each network is typically provided with an entity for managing the mobility of the mobile users. The location of this entity depends on the standards and system. For example, in a General Packet Radio Service (GPRS) based communication network this can be provided in association with a signalling GPRS support node (SGSN). For clarity, and regardless of the used terminology of a particular standard and system, these entities will be referred to herein by the term mobile management entity (MME). A mobile management entity of the home network is called herein a home mobile management entity. A mobile management entity of the visited network is called herein a visited mobile management entity.

One or more gateway nodes may be provided for connecting the network the user is using to other networks, for example to another mobile network, to a public switched telephone network (PSTN) and/or other communication networks such as an IP (Internet Protocol) and/or other data networks.

A communication device such as a mobile user equipment or a mobile station is typically associated with at least one permanent identifier. Non-limiting examples of the permanent identifiers include the international mobile subscriber identity (IMSI), the international mobile equipment identity (IMEI), a user name, a certificate or a cryptographic key. The IMSI is for identifying the user. The IMEI is for identifying the particular device.

An identifier is typically formed of a number of subsections or parts. For example, the international mobile subscriber identity (IMSI) currently consists of a mobile country code (MCC), a mobile network code (MNC) and a mobile subscriber identification number (MSIN). The total maximum length of an IMSI is currently 15 digits. Of the total, the MCC is 3 digits and the MNC is 2 or 3 digits depending on the area.

The mobile subscriber identification number (MSIN) part is for identifying the individual subscriber. Thus, from the subscriber's privacy point of view, at least this part of the IMSI should be protected all the time to prevent possibility of misuse of the possibly sensitive information.

An air interface in a radio access network is vulnerable to attacks. Communication over public IP networks may also be subject to attacks. Therefore the parts containing sensitive information should not be communicated unprotected in an insecure signalling environment. For example, subscribers should be protected against tracking of plain text i.e. unprotected IMSIs or other identifiers. This is especially difficult in the case of setting up a relationship between two communicating entities.

On the other hand, the credentials of a subscriber cannot typically be fetched before the subscriber has been reliably identified by the network. For this reason there is typically provided a secure data storage facility at the home network of the subscriber for maintaining information about the subscriber, for example information that may be used to interpret the contents of the MSIN part of an IMSI.

Certain radio access networks or other trusted network elements are allowed to send an enquiry to a user equipment for the permanent identity associated with the user equipment (UE). This may be allowed, for example, for authentication purposes in case the network does not have any identity, for example a temporary identity, for the user equipment. This leaves open the possibility that an attacker could use a tracker to obtain the permanent identity and track the user's movements and/or presence. Different service requests of a user may also be mapped together and a personal user profile created e.g. for spamming purposes. For example, IMSI catchers are known to have been developed for this purpose. These are typically based on the realisation that it is possible for an attacker to create a false base station to which a user equipment then attaches to. The false base station may then inform the user equipment that it does not have any temporary identities of any sort for the user equipment, thus requesting a plain text IMSI from the UE.

A network element can thus claim not to have the permanent identity of a user equipment. An attacker may try to fool the user equipment by pretending to be an element of the network and ask for the IMSI directly from the user equipment. The user equipment may have no option to deny the request, but will send the identity back in a non-protected format and hence have no way to avoid the tracking of himself and/or his device.

To illustrate this threat further, let us consider the case where a short range IMSI catcher is used together with some kind of user identification system, for example based on a credit card or similar. This enables an attacker to collect pairs of user identities and IMSIs. An attacker could also add IMSI catchers to certain locations to collect history of pass by IMSIs.

U.S. Pat. No. 6,373,949 discloses a way to protect the IMSI by encrypting the mobile subscriber identification number (MSIN) part of the IMSI with a home operator public key. However, this still leaves a problem of protecting an IMSI that is sent in clear text format over an air interface from a user equipment to the network that in turn can be used for tracking or to compromise the user's privacy. This type of transmission may be needed in occasions where the network does not know how to decrypt the encrypted MSIN part. In other words, an entity managing the mobility of a mobile user may not know where the secret key of the corresponding public key is located.

Embodiments of the present invention aim to provide an alternative solution to the problem of protecting identifiers in a communications system.

SUMMARY

According to an embodiment of the present invention, there is provided a method including sending a request for an identifier from a first network entity to a user equipment and receiving, by the first network entity, a message indicating that a public key is required from the user equipment. The method also includes sending, by the first network entity, the public key to the user equipment and receiving an encrypted identifier by the first network entity, wherein upon authenticating the public key, the user equipment encrypts at least part of the identifier using the public key and sends the encrypted identifier to the first network entity, thereby enabling further processing between the network entity and the user equipment.

According to another embodiment of the invention, there is provided a method including receiving, by a user equipment, a request for an identifier from a first network entity and sending, from the user equipment to the first network entity, a message indicating that a public key is required. The method also includes receiving the public key by the user equipment from the first network entity, authenticating the public key and encrypting at least part of the identifier using the public key, by the user equipment and sending the encrypted identifier from the user equipment to the first network entity, thereby enabling further processing between the network entity and the user equipment.

According to another embodiment of the invention, there is provided a network entity including a sending unit configured to send a request to a user equipment for an identifier and a receiving unit configured to receive a message indicating that a public key is required from the user equipment. The network entity also includes a sending unit configured to send the public key to the user equipment and a receiving unit configured to receive an encrypted identifier from the user equipment, wherein upon authenticating the public key, the user equipment encrypts at least part of the identifier using the public key, thereby enabling further processing between the network entity and the user equipment.

According to another embodiment of the invention, there is provided a method including receiving a request for an identifier by a user equipment from a network and using, by the user equipment, an identifier of the network as a public key to encrypt the identifier of the user equipment using identity based cryptography (IBC). The method also includes sending, by the user equipment, the encrypted identifier to the network.

According to another embodiment of the invention, there is provided a method of sending a request from a network to a user equipment for an identifier, the request including an indicator that the network supports encrypted identifiers and receiving an encrypted identifier by the network from the user equipment.

According to another embodiment of the invention, there is provided a system including a network entity configured to send a request to a user equipment for an identifier and the user equipment configured to send a message indicating that a public key is required to the network entity. The system also includes in response to the message, the network entity is configured to send the public key to the user equipment. Upon receipt of the public key, the user equipment is configured to authenticate the public key, encrypts at least part of the identifier using the public key and send an encrypted identifier from the network entity, thereby enabling further processing between the network entity and the user equipment.

According to another embodiment of the invention, there is provided a computer program product embodied on a computer readable medium, the computer program including program code for controlling a processor to execute a method including sending a request from a first network entity to a user equipment for an identifier. The method also includes receiving a message indicating that a public key is required from the user equipment by the first network entity, sending, by the first network entity, the public key to the user equipment and receiving an encrypted identifier by the first network entity, wherein upon authenticating the public key, the user equipment encrypts at least part of the identifier using the public key, thereby enabling further processing between the network entity and the user equipment.

Another embodiment of the invention includes a user equipment including a receiving unit configured to receive a request for an identifier from a first network entity and a sending unit configured to send to the first network entity, a message indicating that a public key is required. The user equipment also includes a receiving unit configured to receive the public key from the first network entity, an authenticating unit configured to authenticate the public key and encrypt at least part of the identifier using the public key, by the user equipment and a sending unit configured to send the encrypted identifier to the first network entity, thereby enabling further processing between the network entity and the user equipment.

BRIEF DESCRIPTION OF THE DRAWINGS

The invention will now be described in further detail, by way of example only, with reference to the following examples and accompanying drawings, in which:

FIG. 4 shows a known identity type information element; and

FIG. 5 shows known bit values for the identity type information element.

DETAILED DESCRIPTION OF PREFERRED EMBODIMENTS

Certain embodiments for at least partially protecting identifiers will now be described by way of example with reference to an exemplifying mobile communication system. It is noted that the embodiments are examples only, and that the invention may be embodied in any other suitable form of a communication system. Also, although the following example is given in relation to identifiers such as the international mobile subscriber identity (IMSI) and the international mobile equipment identity (IMEI), the embodiments are also applicable to other identifiers.

Figure 1:
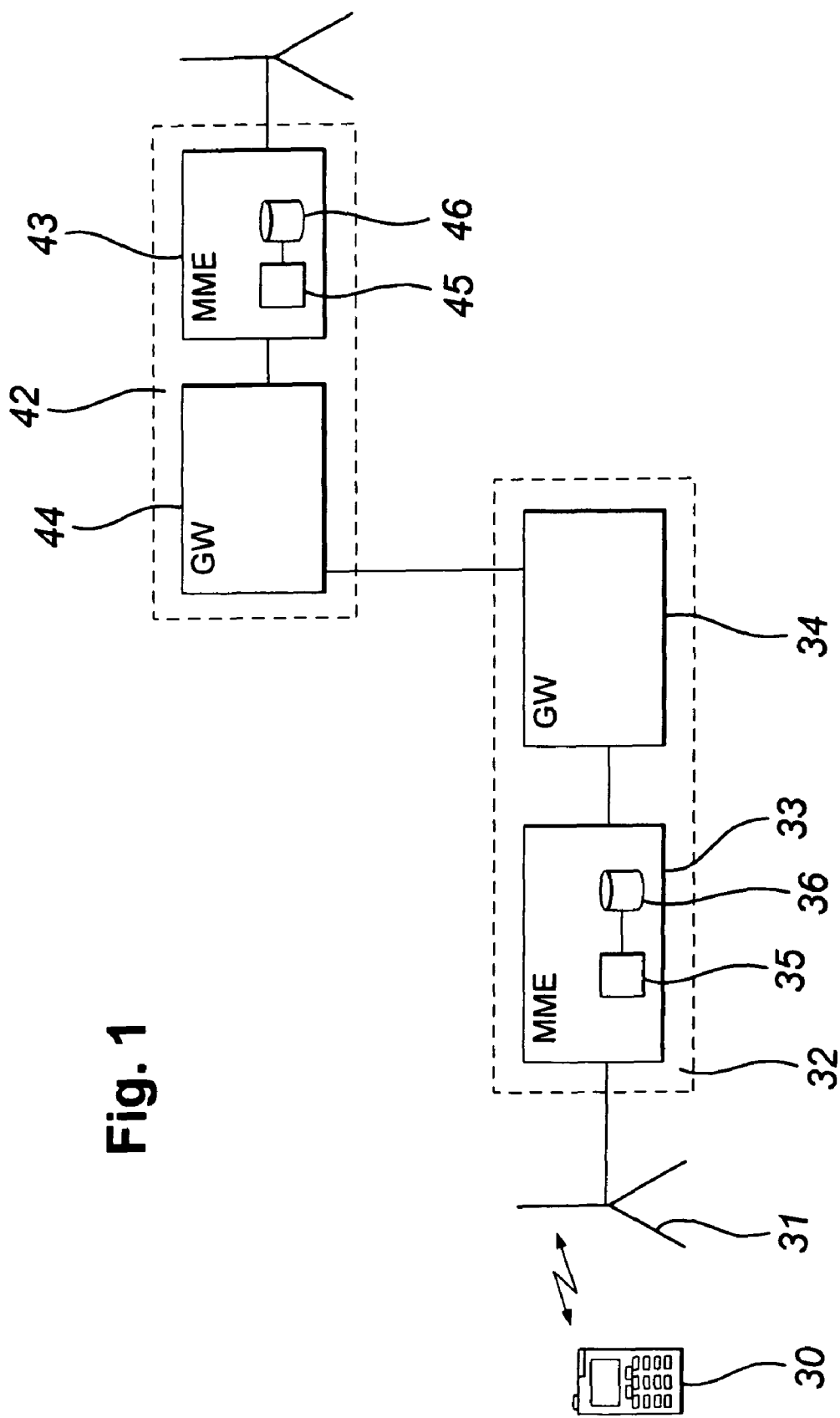
FIG. 1 shows an example of an arrangement in which embodiments may be implemented.

A reference is first made to FIG. 1 showing schematically two mobile communication networks 32 and 42. A communication device 30, referred to herein as the user equipment, is in wireless communication with a base station 31 of the network 32. The user equipment is roaming in the network 32, i.e. only visiting network 32, while it is a subscriber to the network 42. Hence the network 42 is referred to below as the home network. Each of the visited and the home network is provided with an appropriate mobility management entity 33 and 43, respectively. The networks are connected via appropriate gateway nodes 34 and 44. It is understood that a mobile network may comprise other elements than those shown, such as various controller and signalling nodes. These, however, are not shown for clarity.

The mobility management entities 33 and 43 are provided with appropriate data processing element 35 and 45 and data storages 36 and 46 for enabling them to perform the operations of the embodiments as described below with reference to FIGS. 2 and 3.

Figure 2:
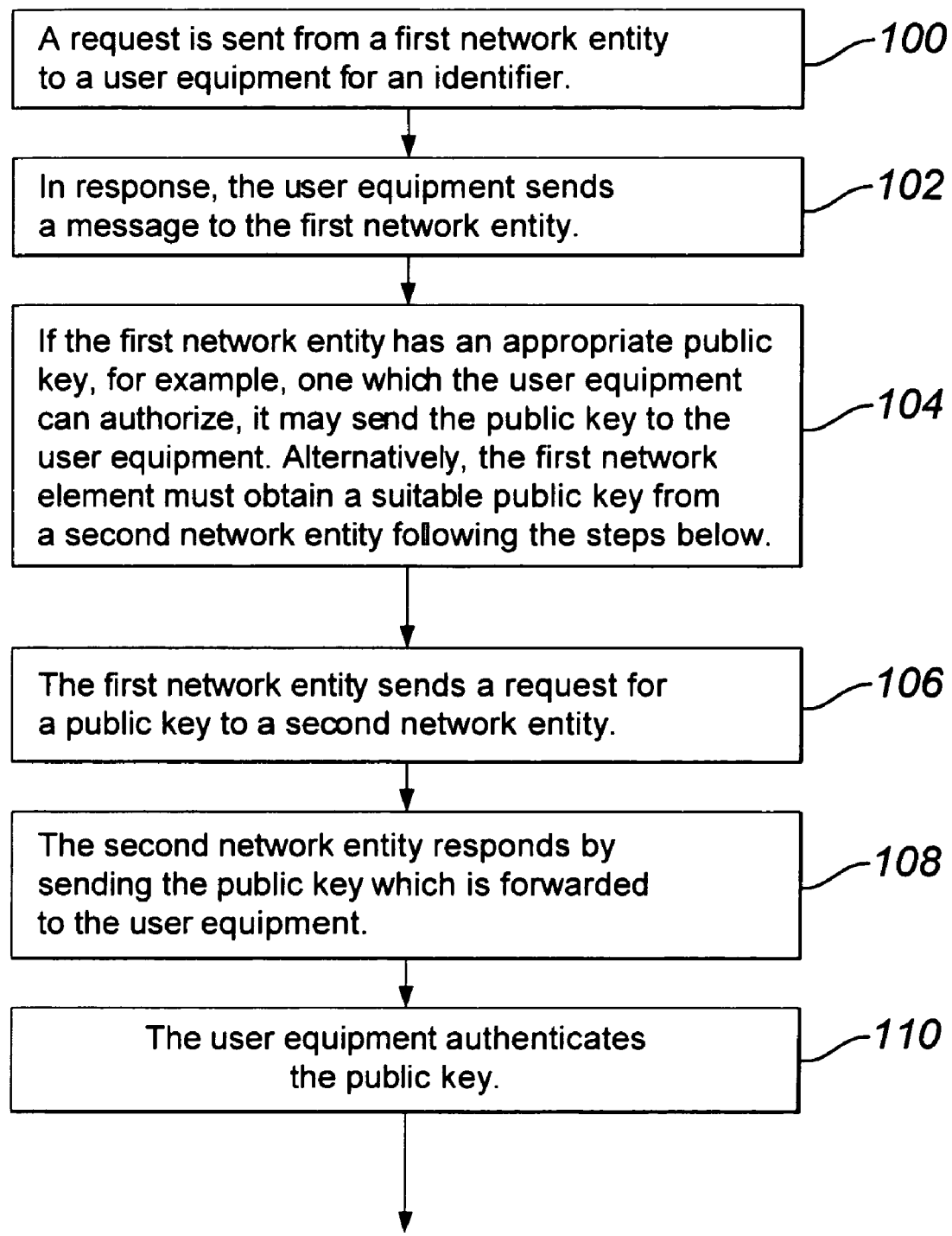
FIG. 2 shows a flowchart illustrating an embodiment.

FIG. 2 shows a flowchart illustrating an embodiment.

At step 100 a request is sent from a first network entity to a user equipment for an identifier. At step 102, in response, the user equipment sends a message to the first network entity indicating that a public key is required. At step 104, if the first network entity has an appropriate public key, for example, one which the user equipment can authorize, it may send the public key to the user equipment. Alternatively, the first network element must obtain a suitable public key from a second network entity following the steps below.

At step 106, the first network entity sends a request for a public key to a second network entity. At step 108, the second network entity responds by sending the public key which is forwarded to the user equipment. At step 110, the user equipment then authenticates the public key. At step 112, once authenticated, the user equipment encrypts at least a part of the identifier using the public key and sends the encrypted identifier to the first network entity. At step 114, if the first network entity is capable of decrypting the identifier, it is then decrypted. An intended operation, for example an authentication procedure, may then follow.

However, if decryption is not possible at the first network entity, the second network entity is asked for assistance in decrypting the encrypted identifier. This operation is set out in step 116. The first network entity can either send the encrypted identifier to the second network entity to decrypt the identifier on its behalf. Alternatively, it can request the necessary secret key from the second network entity for decrypting the encrypted identifier itself.

Figure 3:
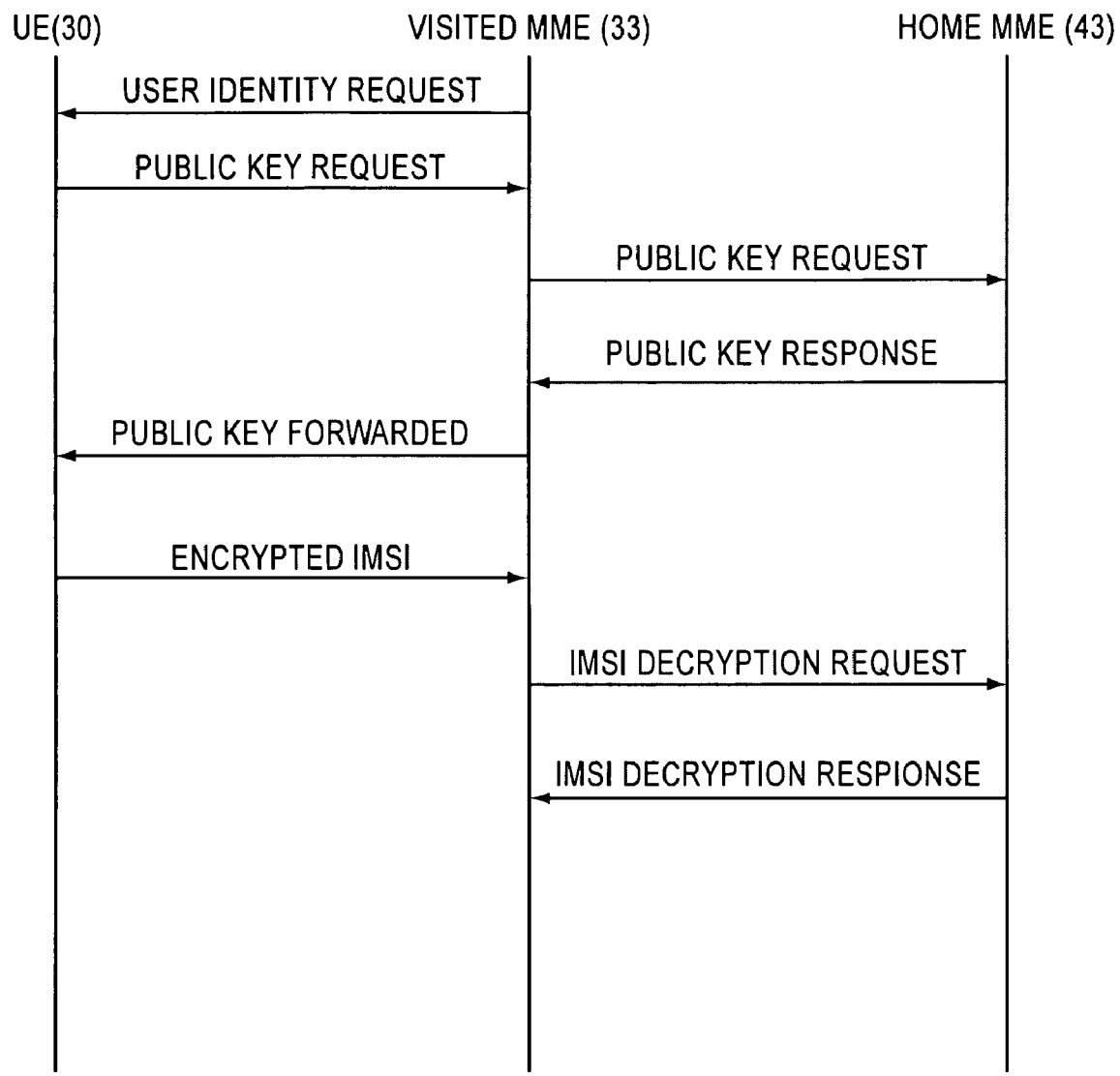
FIG. 3 shows a signaling flowchart illustrating an embodiment.

FIG. 3 shows a signalling flowchart illustrating an embodiment implemented in the network arrangement shown in FIG. 1.

A request is sent from the visited mobile management entity 33 to the user equipment 30 for an identifier. In response, the user equipment 30 sends a message to the visited mobile management entity 33 indicating that a public key is required. The visited mobile management entity 33 sends a request for a public key to the home mobile management entity 43. The home mobile management entity 43 responds by sending the public key which is forwarded on to the user equipment 30. The user equipment then authenticates the public key and, once authenticated, the user equipment encrypts at least a part of the identifier using the public key and sends the encrypted identifier to the visited mobile management entity 33. If the visited mobile management entity 33 is capable of decrypting the identifier, it is then decrypted. An intended operation, for example an authentication procedure, may then follow. However, if decryption is not possible at the visited mobile management entity 33 the home mobile management entity 43 is asked for assistance in decrypting the encrypted identifier. A processor of the home mobile management entity 43 may then decrypt the message based on information stored in a data storage thereof and return the identifier in decrypted format to the visited mobile management entity 33. Alternatively, the home mobile management entity 43 only sends back information that is required in the decryption by the visited mobile management entity 33.

Once the visited mobile management entity 33 is in possession of the identifier in decrypted format, the user equipment is served by the visited network in the usual manner.

User privacy, especially location privacy, can be protected by one of the following two examples:
1. The UE asks for a certificate (public key) from the network with an IMSI, where the MSIN part of the IMSI is omitted (for example, the MSIN part may be all zeros) thus not compromising user's privacy. The MCC and MNC parts of the IMSI are valid and based on these parts the network provides a proper (e.g. operator signed) certificate for the UE. The UE must be able to authenticate this certificate, for example, based on Nokia, operator, or trusted third party certificates pre-installed into the device.
2. The UE can use a subscriber certificate issued via the Generic Authentication Architecture (GAA).
3. The UE can use Identity Based Public Keys Cryptography (IBC)

Implementations for the aforementioned examples include:
1. The UE uses an access network certificate signed by the UE's home operator (identified by the MCC and MNC parts of the IMSI) to encrypt the IMSI.
2. The UE uses a public key contained in an operator issued subscriber certificate to encrypt the IMSI.

Embodiments provide an extension of the known identity request protocol. The UE may provide an encrypted identity or query the network to provide a proper public key certificate (e.g. signed with a common CA with the user equipment, like the user's home operator).

In the identity request protocol an Identity Type information element is used to specify which identity is requested. The Identity Type information element is coded as shown in FIGS. 4 and 5. The Identity Type is a type 1 information element.

The user equipment can send an identity response with existing "identity type" value 001 and set the MSIN digits to all zero, indicating that it has sent an IMSI without the MSIN part ("I don't have your certificate, and I don't have a subscriber certificate"). Optionally, the UE may include which options it has to validate a certificate (e.g. indicating that it has a Nokia or trusted third party root certificate).

The network provides a certificate that is signed by a Certificate Authority (e.g. operator, trusted third party, Nokia) that the UE can identify (for example, the UE's home operator identified with the MCC/MNC parts of the IMSI).

The UE's message triggers the network to respond with a new message that includes an access network certificate that the UE can verify. If the UE already has a corresponding access network certificate, then this is an optional step and the UE can provide an encrypted IMSI right away. If the network does not understand the encrypted IMSI, then it can answer as if the UE had requested a certificate.

The UE uses either (A) the access network certificate or (B) a public key contained in the GAA subscriber certificate to encrypt the IMSI and uses the new "identity type" value 110 ("encrypted IMSI"). The encrypted IMSI thus shows if a subscriber certificate or access network certificate has been used to encrypt the IMSI. In case of encrypted IMEI the "identity type" value is 111.

Using an access network certificate requires that the UE has a way to authenticate the certificate, e.g. a common Certificate Authority (CA) such as the home operator.

Using a subscriber certificate requires that the access network contacts the subscribers home Bootstrapping Server Function (BSF) of the Generic Bootstrapping Architecture (GBA) system for IMSI decryption. Thus, the access network acts as a Network Application Function (NAF).

The network queries the BSF or the UE's home operator network (MME or HSS (Home Subscriber Server)) to get a signed access network specific certificate. The BSF may be collocated with the HSS or connected to some other user database.

Identity based public key cryptography (IBC) has proven to be secure in the area of public key cryptography and has the advantage of using identities themselves as public keys. This requires that the public IBC parameters are configured into the UE when provisioned to the customer. IBC allows the UE to take the visited network identity and use it as a public key to encrypt the IMSI (or other information). The benefit in this kind of setup is that the UE does not have to get or store any public keys or certificates. Thus, there is no need to provision certificates from the network to the UEs and to authenticate them in the UE.

The home operator can always decrypt the encrypted IMSI provided that it knows which identity was used to encrypt the MSIN part of the IMSI. Based on the interface between the visited operator and the home operator, the home operator knows which visited network it is communicating with and thus also the identity used to encrypt the IMSI (or actually the MSIN part of the IMSI). As a result, the IBC has also the advantage that the UE authenticates the visited network via the home network before the IMSI is revealed for it.

Thus, while IBC is known to use the recipients identity as a public key when encrypting the data, the usage to protect IMSIs in cellular networks by using the visited network identity as the public key is new, and is extremely suitable for this area, as the home network does not have to provide any keying material for the visited network. Using IBC, certificate chain verification and certificate provisioning is not needed.

One possibility, although optional, is to provide a corresponding private key for the visited network operator to speed up the IMSI decryption process if needed. However, the visited network may need to get quintets for the UE from the home network anyway.

An additional optional feature is that the network requests an encrypted IMSI or pseudonym like P-TMSI (Packet Temporary Mobile Subscriber Identity). In the identity request, the network can ask for a pseudonym (P-TMSI) or encrypted IMSI—new "identity type 2" value 110 ("encrypted IMSI or pseudonym").

An additional new feature is to use the spare bit 4 in octet 1 in the identity request message to indicate that the network supports encrypted identities (bit is set to 1). This is backwards compatible with UTRAN, as the user equipment that does not support encrypted identities and thus does not care about the spare bit if set to 1 (at least based on the specification, but implementations may differ for example if they do not mask the bit 4 away).

In the identity request, the network can ask for an encrypted IMEI or IMEISV (International Mobile station Equipment Identity and Software Version Number)—new "identity type 2" value 111 ("encrypted IMEI or IMEISV").

Using certificates which the UE can authenticate may also provide network authentication. Note that the 3G AKA (Authentication and Key Agreement) authentication method does not distinguish between the networks and thus the UE may not be able to verify if it is in the home or a visited network.

Furthermore, when needed, the certificate can be updated.

The required data processing functions may be provided by means of one or more data processor entities. The required processing may be provided in the mobile user equipment or a network element such as the base station transceiver/Node B or equivalent. An appropriately adapted computer program code product may be used for implementing the embodiments, when loaded to a computer or processor. The program code product for providing the operation may be stored on and provided by means of a carrier medium such as a carrier disc, card, or tape. A possibility is to download the program code product via a data network. Implementation may be provided with appropriate software.

While this invention has been particularly shown and described with reference to certain embodiments, it will be understood to those skilled in the art that various changes in form and detail may be made without departing from the scope of the invention.

According to an aspect of the invention there is provided a method in which: in response to a request from a first network entity for an identifier, a message is sent from a user equipment to the first network entity indicating that a public key is required; the first network entity sends the public key to the user equipment; the user equipment authenticates the public key, encrypts at least part of an identifier using the public key, and sends the encrypted identifier to the first network entity.

According to an embodiment, after receiving the message indicating that a public key is required, the first network entity sends a request to a second network entity for the public key and the second network entity sends the public key to the first network entity which forwards it to the user equipment.

According to an embodiment, the message indicating that a public key is required also identifies the second network entity where the public key is stored and the first network entity determines the identity of the second network entity based on the message and sends the request to the second network entity for the public key based on this determination.

According to an embodiment, after receiving the encrypted identifier, the first network entity can either decrypt the identifier or request for assistance in decryption of the identifier from the second network entity.

According to an embodiment, if assistance is requested, either the second network entity decrypts the identifier based on information stored in a data storage thereof and returns the identifier in decrypted format to the first network entity, or the second network entity sends back information that is required in the decryption by the first network entity.

According to an embodiment, the user equipment is able to authenticate the public key using information stored in the user equipment or by sending a request to a validation entity.

According to an embodiment, the information includes one or more certificate authority (CA) root certificates.

According to an embodiment, the message sent from the user equipment to the first network entity indicating that a public key is required also includes an indication of which options the user equipment has available for authenticating public keys.

According to an embodiment, said indication includes which CA root certificates are available to the user equipment.

According to an embodiment, the second network entity is a network entity of the home network of the user equipment.

According to an embodiment, the second network entity is a mobile management entity of the home network.

According to an embodiment, the second network entity is a network entity of a Generic Authentication Architecture (GAA).

According to an embodiment, the public key is contained in an operator issued subscriber certificate.

According to an embodiment, the operator certificate is provided in a subscriber certificate.

According to an embodiment, the subscriber certificate is issued via a Generic Authentication Architecture (GAA).

According to an embodiment, the message sent from the user equipment to the first network entity indicating that a public key is required is an international mobile subscriber identity (IMSI), where a mobile subscriber identification number (MSIN) part of the IMSI is omitted, the first network entity providing the public key based on a mobile country code (MCC) and a mobile network code (MNC) part of the IMSI.

According to an embodiment, the message sent from the user equipment to the first network entity indicating that a public key is required comprises an identity response with an identity type value 001 and MSIN digits all zero, indicating that the user equipment doesn't have a public key.

According to an embodiment, the encrypted identifier sent to the first network entity includes an indicator showing that the identifier has been encrypted.

According to an embodiment, the indicator shows if a subscriber certificate or access network certificate has been used to encrypt the identifier.

According to an embodiment, the request from the first network entity to the user equipment for an identifier includes an indication that the first network entity supports encrypted identifiers.

According to an embodiment, the public key sent from the first network entity to the user equipment is an identifier of the first network entity and the user equipment uses said identifier to encrypt the identifier of the user equipment using identity based cryptography (IBC).

According to an aspect of the invention there is provided a method in which: a request is sent from a network to a user equipment for an identifier; the user equipment uses an identifier of the network as a public key to encrypt the identifier of the user equipment using identity based cryptography (IBC); and the encrypted identifier is sent to the network.

According to an embodiment, the network is a visited network.

According to an embodiment, the identifier is an IMSI.

According to an aspect of the invention there is provided a method in which: a request is sent from a network to a user equipment for an identifier, the request including an indicator that the network supports encrypted identifiers; the user equipment encrypts the identifier; and the encrypted identifier is sent to the network.

According to an embodiment, the indicator is provided in a spare bit of an identity request message.

According to an aspect of the invention there is provided a user equipment adapted to perform the method described above.

According to an aspect of the invention there is provided a network entity adapted to perform the method described above.

According to an aspect of the invention there is provided a communication system adapted to perform the method described above.

According to an aspect of the invention there is provided a computer program comprising program code means adapted to perform the method described above when the program is run on a computer or on a processor.

According to an aspect of the invention there is provided a computer program product comprising program code means stored in a computer readable medium, the program code means being adapted to perform the method described above when the program is run on a computer or on a processor.

The invention claimed is:

1. A method comprising:
   sending a request for an identifier from a first network entity to a user equipment;
   receiving, by the first network entity, a first message indicating that a public key is required by the user equipment;
   receiving, by the first network entity, a second message identifying a second network entity where the public key is stored;
   determining, by the first network entity, the identity of the second network entity based on at least the second message;
   sending, by the first network entity, the request to the second network entity for the public key based on at least the determining;
   receiving, by the first network entity, the public key from the second network entity;
   sending, by the first network entity, the public key to the user equipment; and
   receiving, by the first network entity, an encrypted identifier sent from the user equipment, wherein upon authenticating the public key, the user equipment encrypts at least part of the identifier using the public key sent to the user equipment by the first network entity.

2. The method of claim 1, further comprising at least one of:
   decrypting, by the first network entity, the identifier; or
   requesting, by the first network entity, assistance in decryption of the identifier from the second network entity.

3. The method of claim 2, further comprising at least one of:
   if assistance is requested, decrypting, by the second network entity, the identifier based on information stored in the second network entity and returning the identifier in decrypted format to the first network entity; or
   sending, by the second network entity, information that is required in the decryption by the first network entity.

4. A method comprising:
   receiving, by a user equipment, a request for an identifier from a first network entity;
   sending, from the user equipment to the first network entity, a first message indicating that a public key is required, wherein the first network entity receives a second message identifying a second network entity where the public key is stored, the first network entity determines an identity of the second network entity based on at least the second message, sends the request to the second network entity for the public key based on at least the determined identity of the second network, and receives the public key from the second network entity;

receiving, by the user equipment, the public key from the first network entity encrypting, by the user equipment, at least part of the identifier using the public key sent to the user equipment by the first network entity, wherein the user equipment authenticates the public key before the encrypting and sending the encrypted at least part of the identifier from the user equipment to the first network entity.

5. The method of claim 4, wherein authenticating the public key comprises at least one of authenticating the public key using information stored in the user equipment or sending another request to a validation entity.

6. The method of claim 4, wherein the public key includes one or more certificate authority root certificates.

7. The method of claim 4, wherein the message sent from the user equipment to the first network entity indicating that a public key is required includes an indication of which options the user equipment has available for authenticating public keys.

8. The method of claim 7, wherein said indication includes which certificate authority root certificates are available to the user equipment.

9. An apparatus comprising:
at least one processor; and
at least one memory including code which when executed provides operations comprising:
sending a request for an identifier from a first network entity to a user equipment;
receiving, by the first network entity, a first message indicating that a public key is required by the user equipment;
receiving, by the first network entity, a second message identifying a second network entity where the public key is stored;
determining, by the first network entity, the identity of the second network entity based on at least the second message;
sending, by the first network entity, the request to the second network entity for the public key based on at least the determining;
receiving, by the first network entity, the public key from the second network entity;
sending, by the first network entity, the public key to the user equipment; and
receiving, by the first network entity, an encrypted identifier sent from the user equipment, wherein upon authenticating the public key, the user equipment encrypts at least part of the identifier using the public key sent to the user equipment by the first network entity.

10. The apparatus of claim 9, further comprising at least one of:
decrypting the identifier; or
requesting assistance in decryption of the identifier from the second network entity.

11. The apparatus of claim 10, wherein if assistance is requested, the network entity further comprises at least one of:
receiving the identifier in decrypted format created by the second network entity based on information stored in the second network entity; or receiving information that is required in the decryption from the second network entity.

12. The apparatus of claim 9, wherein the second network entity is a network entity of the home network of the user equipment.

13. The apparatus of claim 9, wherein the second network entity is a mobile management entity of the home network.

14. The apparatus of claim 9, wherein the second network entity is a network entity of a general authentication architecture.

15. The apparatus of claim 9, wherein the public key is stored in an operator issued subscriber certificate.

16. The apparatus of claim 15, wherein the operator certificate is provided in a subscriber certificate.

17. The apparatus of claim 16, wherein the subscriber certificate is issued via a general authentication architecture.

18. The apparatus of claim 9, wherein the first message sent from the user equipment to the first network entity indicating that a public key is required is an international mobile subscriber identity, where a mobile subscriber identification number part of the international mobile subscriber identity is omitted, the first network entity providing the public key based on a mobile country code and a mobile network code part of the international mobile subscriber identity.

19. The apparatus of claim 9, wherein the message sent from the user equipment to the first network entity indicating that the public key is required comprises an identity response with an identity type value 001 and mobile subscriber identification number digits all zero, indicating that the user equipment is missing the public key.

20. The apparatus of claim 9, wherein the received encrypted identifier includes an indicator showing that the identifier has been encrypted.

21. The apparatus of claim 20, wherein the indicator shows if a subscriber certificate or access network certificate has been used to encrypt the identifier.

22. The apparatus of claim 9, wherein the request from the first network entity to the user equipment for the identifier includes an indication that the first network entity supports encrypted identifiers.

23. The apparatus of claim 9, wherein the public key sent from the first network entity to the user equipment is an identifier of the first network entity and the user equipment uses the identifier to encrypt the identifier of the user equipment using identity based cryptography.

24. A method comprising:
sending a request from a network to a user equipment for an identifier, the request including an indicator that the network supports encrypted identifiers; and
receiving an encrypted identifier by the network from the user equipment,
wherein the indicator is provided in a spare bit of the request.

25. A system comprising:
a first network entity configured to send a request for an identifier to a user equipment;
the user equipment configured to send a first message indicating that a public key is required to the first network entity;
the first network entity further configured to receive a second message identifying a second network entity where the public key is stored;
the first network entity further configured to determine the identity of the second network entity based on the second message;

the first network entity further configured to send the request to the second network entity for the public key based on the determination;

the first network entity further configured to receive the public key from the second network entity;

upon receipt of the public key, the user equipment is further configured to authenticate the public key, encrypt at least part of the identifier using the public key sent to the user equipment by the network entity.

26. A non-transitory computer readable medium including code which when executed by at least one processor provides operations comprising:

sending a request for an identifier from a first network entity to a user equipment;

receiving, by the first network entity, a first message indicating that a public key is required by the user equipment;

receiving, by the first network entity, a second message identifying a second network entity where the public key is stored;

determining, by the first network entity, the identity of the second network entity based on at least the second message;

sending, by the first network entity, the request to the second network entity for the public key based on at least the determining;

receiving, by the first network entity, the public key from the second network entity;

sending, by the first network entity, the public key to the user equipment and receiving, by the first network entity, an encrypted identifier sent from the user equipment, wherein upon authenticating the public key, the user equipment encrypts at least part of the identifier using the public key sent to the user equipment by the first network entity.

27. An apparatus comprising:

at least one processor; and at least one memory including code which when executed provides operations comprising:

receiving, by a user equipment, a request for an identifier from a first network entity;

sending, from the user equipment to the first network entity, a first message indicating that a public key is required, wherein the first network entity receives a second message identifying a second network entity where the public key is stored, the first network entity determines an identity of the second network entity based on at least the second message, sends the request to the second network entity for the public key based on at least the determined identity of the second network, and receives the public key from the second network entity;

receiving, by a user equipment, the public key from the first network entity encrypting, by the user equipment, at least part of the identifier using the public key sent to the user equipment by the first network entity; and sending the at least part of the encrypted identifier to the first network entity.

28. The apparatus of claim 27, wherein the public key is authenticated using information stored in the user equipment.

29. The method of claim 1, wherein the first network entity requests a secret key from a second network entity for decrypting the encrypted identifier.

30. The apparatus of claim 9, wherein the network entity requests a secret key from another network entity for decrypting the encrypted identifier.

31. The system of claim 25, wherein the first network entity requests a secret key from another network entity for decrypting the encrypted identifier.

32. The non-transitory computer readable medium of claim 26, wherein the first network entity requests a secret key from the second network entity for decrypting the encrypted identifier.

33. A non-transitory computer readable medium including code which when executed by at least one processor provides operations comprising:

receiving, by a user equipment, a request for an identifier from a first network entity;

sending, from the user equipment to the first network entity, a first message indicating that a public key is required, wherein the first network entity receives a second message identifying a second network entity where the public key is stored, the first network entity determines an identity of the second network entity based on at least the second message, sends the request to the second network entity for the public key based on at least the determined identity of the second network, and receives the public key from the second network entity;

receiving, by the user equipment, the public key from the first network entity;

encrypting, by the user equipment, at least part of the identifier using the public key sent to the user equipment by the first network entity, wherein the user equipment authenticates the public key before the encrypting; and sending the encrypted at least part of the identifier from the user equipment to the first network entity.

34. The method of claim 24, wherein the identifier is encrypted using a public key sent by the network in response to a message from the user equipment to indicate that the public key is required.

* * * * *